United States Patent [19]

Kawakami et al.

[11] Patent Number: 4,858,713

[45] Date of Patent: Aug. 22, 1989

[54] POWER-ASSISTED STEERING SYSTEM

[75] Inventors: Hiroshi Kawakami; Harunori Shiratori; Koichi Sugihara; Atsushi Watanabe; Fumio Kishida, all of Toyota, Japan

[73] Assignee: Toyota Jidosha Kabushiki Kaisha, Aichi, Japan

[21] Appl. No.: 163,947

[22] Filed: Mar. 3, 1988

Related U.S. Application Data

[62] Division of Ser. No. 19,419, Feb. 26, 1987, Pat. No. 4,765,428.

[30] Foreign Application Priority Data

Feb. 26, 1986 [JP]  Japan ..................... 40647

[51] Int. Cl.$^4$ ............................... B62D 5/09
[52] U.S. Cl. .................... 180/143; 91/375 A
[58] Field of Search ............... 180/143, 141, 142, 132, 180/133, 146, 147, 149; 91/375 R, 375 A, 434, 370, 371; 60/375

[56] References Cited

U.S. PATENT DOCUMENTS

| | | | |
|---|---|---|---|
| 4,034,825 | 7/1977 | Adams | 180/143 |
| 4,606,424 | 8/1986 | Hasegawa | 180/143 |
| 4,619,339 | 10/1986 | Futaba | 180/143 |
| 4,621,704 | 11/1986 | Kozuka | 180/143 |
| 4,632,204 | 12/1986 | Itonaga | 180/142 |
| 4,678,052 | 7/1987 | Suzuki et al. | |

FOREIGN PATENT DOCUMENTS

| | | | |
|---|---|---|---|
| 49-30659 | 8/1974 | Japan . | |
| 12469 | 1/1986 | Japan | 180/142 |
| 61-30463 | 2/1986 | Japan . | |
| 86/07323 | 12/1986 | World Int. Prop. O. | 180/143 |

*Primary Examiner*—Charles A. Marmor
*Attorney, Agent, or Firm*—Oliff & Berridge

[57] ABSTRACT

A power-assisted steering system includes a changeover valve unit comprising an input shaft to be rotated by the driver's steering effort applied thereto, an output shaft operatively connected to a hydraulic power cylinder associated with the steering system, a valve assembly for controlling the supply of fluid under pressure from a hydraulic pump to the power cylinder in response to relative rotation between the input and output shafts; and a hydraulic reaction mechanism for applying a reaction force to the input shaft in accordance with a hydraulic reaction pressure applied thereto. The reaction mechanism includes a reaction fluid chamber to be constantly applied with a predetermined small quantity of fluid under pressure and to be applied with a hydraulic pressure caused by relative rotation between the input and output shafts through a throttle. The system is arranged to increase the hydraulic pressure in the reaction fluid chamber in accordance with an increase of travel speed of the vehicle.

5 Claims, 3 Drawing Sheets

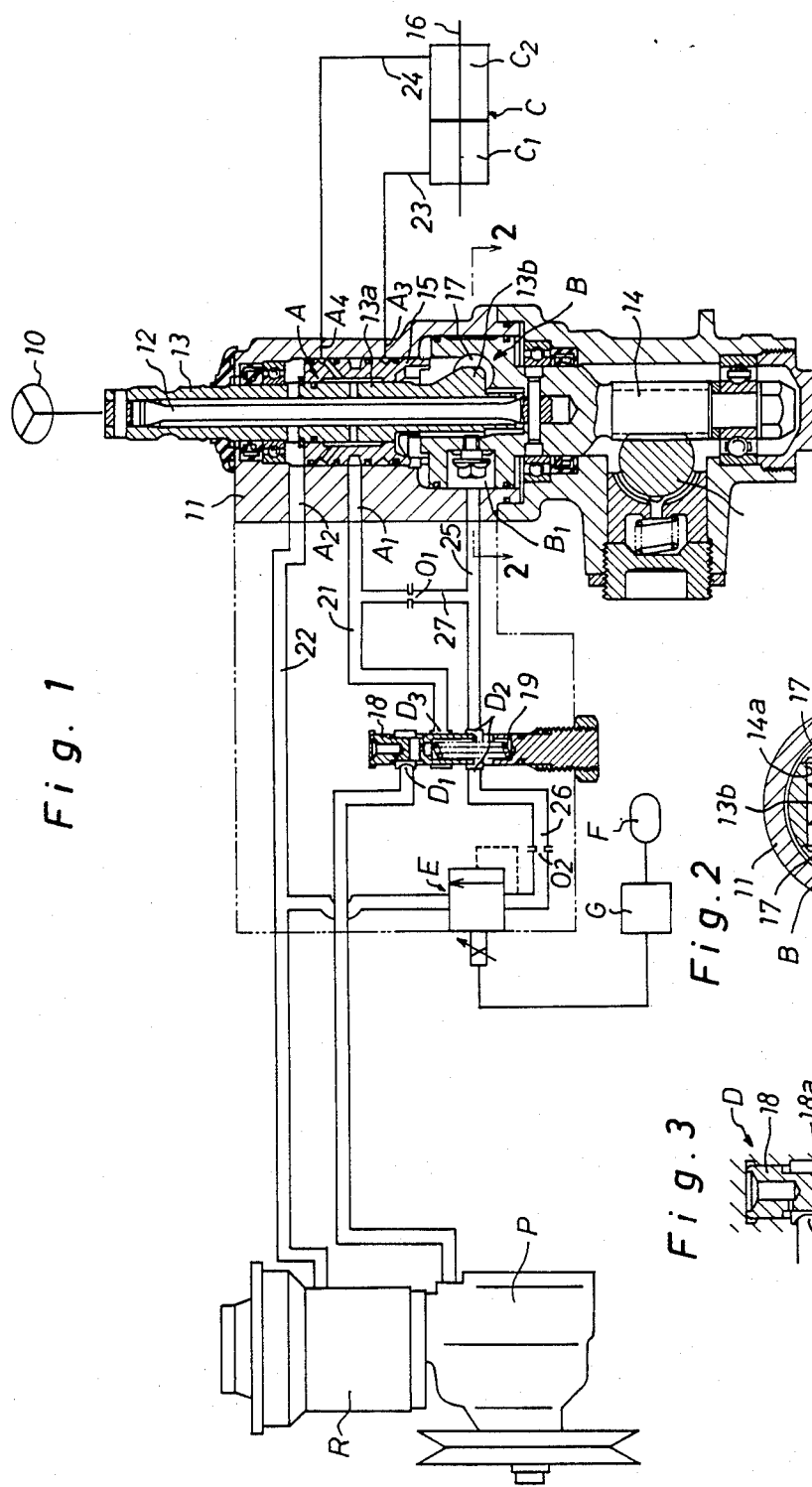
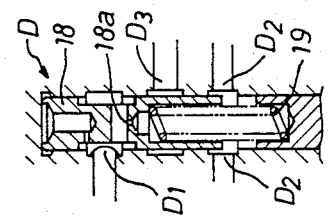
Fig. 1
Fig. 2
Fig. 3

POWER-ASSISTED STEERING SYSTEM

This is a division of application Ser. No. 019,419 filed Feb. 26, 1987, now U.S. Pat. No. 4,765,428, issued Aug. 23, 1988.

BACKGROUND OF THE INVENTION

1. Field of the Invention

The present invention relates to power-assisted steering systems in automotive vehicles, and more particularly to a power-assisted steering system of the type which includes a hydraulic reaction mechanism for applying a reaction force to the driver's steering effort in accordance with travel speed of the vehicle.

2. Description of the Prior Art

In Japanese Patent Publication No. 49-30659 there has been proposed a power-assisted steering system of this kind which includes a hydraulic reaction mechanism for applying a reaction force to the driver's steering effort in accordance with a steering load acting on the dirigible road wheels of the vehicle and travel speed of the vehicle. In such a conventional steering system, the reaction mechanism includes a reaction fluid chamber to be applied with a hydraulic pressure caused by operation of a changeover valve unit in turning maneuvers of the vehicle. The hydraulic pressure in the reaction fluid chamber is controlled to decrease in accordance with an increase of travel speed in the vehicle. For this reason, when the changeover valve unit is maintained in a neutral position, the hydraulic pressure in the reaction fluid chamber becomes approximately zero, resulting in instability of the steering wheel in its neutral position.

SUMMARY OF THE INVENTION

It is, therefore, a primary object of the present invention to provide an improved power-assisted steering system which is capable of increasing a reaction force applied to the steering wheel in its neutral position in accordance with an increase in travel speed of the vehicle.

According to the present invention, the primary object is attained by providing a power-assisted steering system which comprises a hydraulic pump driven by a prime mover of the vehicle for supply of fluid under pressure, a hydraulic power cylinder operatively connected to the dirigible road wheels of the vehicle, a changeover valve unit including an input member arranged to be rotated by the driver's steering effort applied thereto, an output member operatively connected to the power cylinder, and valve means for controlling the supply of fluid under pressure from the pump to the power cylinder in response to relative rotation between the input and output members, a hydraulic reaction mechanism associated with the changeover valve unit to apply a reaction force to the input member in accordance with a hydraulic reaction pressure applied thereto, the reaction mechanism including a reaction fluid chamber to be applied with the hydraulic reaction pressure, a first flow control valve disposed within a first fluid circuit connecting the pump to the valve means of the changeover valve unit and within a second fluid circuit connecting the reaction fluid chamber to a fluid reservoir to permit a predetermined small quantity of fluid under pressure supplied therethrough from the pump to the reaction fluid chamber, a first throttle disposed within a bypass circuit connecting the first fluid circuit to the second fluid circuit between the first flow control valve and the reaction fluid chamber, a second throttle disposed within the second fluid circuit between the first flow control valve and the fluid reservoir, and a second flow control valve disposed within the second fluid circuit downstream of the second throttle to decrease the quantity of fluid discharged therethrough into the fluid reservoir in accordance with an increase of travel speed of the vehicle thereby increasing the hydraulic reaction pressure in the reaction fluid chamber.

Alternatively, the primary object is attained by providing a power-assisted steering system which comprises a primary hydraulic pump driven by a prime mover of the vehicle for supply of fluid under pressure, an auxiliary hydraulic pump driven by the prime mover for supply of a predetermined small quantity of fluid under pressure, a hydraulic power cylinder operatively connected to the dirigible road wheels of the vehicle, a changeover valve unit including an input member arranged to be moved by the driver's steering effort applied thereto, an output member operatively connected to the power cylinder, and valve means for controlling the supply of fluid under pressure from the primary hydraulic pump to the power cylinder in response to relative movement between the input and output members, a hydraulic reaction mechanism associated with the changeover valve unit to apply a reaction force to the input member in accordance with a hydraulic reaction pressure applied thereto, the reaction mechanism including a reaction fluid chamber connected to the auxiliary hydraulic pump to be supplied with the predetermined small quantity of fluid under pressure, a first throttle disposed within a bypass circuit connecting a first fluid circuit between the primary hydraulic pump and the valve means of the changeover valve unit to a second fluid circuit between the auxiliary hydraulic pump and the reaction fluid chamber, a second throttle disposed within a third fluid circuit connecting the second fluid circuit to a fluid reservoir, and a flow control valve disposed within the third fluid circuit downstream of the second throttle to decrease the quantity of fluid discharged therethrough into the fluid reservoir in accordance with an increase of travel speed of the vehicle thereby increasing the hydraulic pressure in the reaction fluid chamber.

In a practical embodiment of the present invention, the hydraulic reaction mechanism may comprise a pair of opposed pistons axially slidably disposed within a radial bore in the output member located in the reaction fluid chamber, and a radial arm integral with the input member and disposed between the pistons. Alternatively, the hydraulic reaction mechanism may comprise two pairs of opposed pistons axially slidably disposed within a pair of parallel radial bores in the output member located in the reaction fluid chamber, and a pair of radial arms integral with the input member and disposed between each pair of the pistons. In addition, it is preferable that the second flow control valve is in the form of a solenoid relief valve disposed within the second fluid circuit to be energized by an electric control signal indicative of travel speed of the vehicle.

BRIEF DESCRIPTION OF THE DRAWINGS

Additional objects, features and advantages of the present invention will be more readily appreciated from the following detailed description of preferred embodiments thereof when considered with reference to the accompanying drawings, in which:

FIG. 1 is a schematic illustration of a power-assisted steering system in accordance with the present invention;

FIG. 2 is a cross-sectional view taken along line 2—2 in FIG. 1, illustrating a hydraulic reaction mechanism in a changeover valve unit adapted to the steering system;

FIG. 3 is an enlarged sectional view of a flow control valve shown in FIG. 1;

DESCRIPTION OF THE PREFERRED EMBODIMENTS

Figure 4:
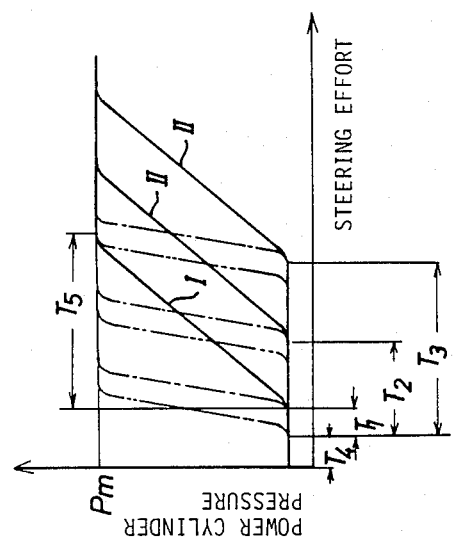
FIG. 4 is a graph illustrating a relationship between a power cylinder pressure and a driver's steering effort.

In FIG. 1 of the drawings there is illustrated a changeover valve unit of the rack and pinion type adapted to a power-assisted steering system in an automotive vehicle. The changeover valve unit includes a rotary valve assembly A for controlling the supply of fluid under pressure to a hydraulic power cylinder C associated with the steering system and a hydraulic reaction mechanism B for applying a reaction force to the driver's steering effort in accordance with travel speed of the vehicle. The rotary valve assembly A comprises a valve housing 11, input and output shafts 13 and 14 arranged for relative rotation on aligned axes within the valve housing 11, a torsion bar 12 interconnecting the input and output shafts 13 and 14, a valve rotor 13a integral with the input shaft 13, and a valve sleeve 15 rotatably mounted within the valve housing 11 in surrounding relationship with the valve rotor 13a. The valve sleeve 15 is connected with the output shaft 14 for rotation therewith and cooperates with the valve rotor 13a to selectively supply fluid under pressure to opposite fluid chambers $C_1$, $C_2$ of the hydraulic power cylinder C in response to relative rotation between the input and output shafts 13 and 14.

The valve housing 11 is provided with an inlet port $A_1$ connected to a discharge port of a hydraulic pump P by way of a fluid circuit 21, an exhaust port $A_2$ connected to a fluid reservoir R of the pump P by way of a fluid circuit 22, and a pair of ports $A_3$ and $A_4$ respectively connected to the opposite fluid chambers $C_1$ and $C_2$ of power cylinder C by way of fluid circuits 23 and 24. The output shaft 14 is in the form of a pinion shaft permanently in mesh with a rack bar 16 which is integrally connected to a power piston in the hydraulic power cylinder C in a usual manner. The rack bar 16 is further operatively connected to a pair of dirigible road wheels of the vehicle through a standard linkage mechanism (not shown). The hydraulic pump P is arranged to be driven by a prime mover of the vehicle.

When the valve rotor 13a is maintained in a neutral position, fluid under pressure from the pump P is supplied to the inlet port $A_1$ of the rotary valve assembly A through the fluid circuit 21 and is circulated to the fluid reservoir R through the exhaust port $A_2$ and fluid circuit 22. When relative rotation occurs between the input and output shafts 13 and 14, the valve rotor 13a cooperates with the valve sleeve 15 to selectively supply fluid under pressure from the pump P to one of the fluid chambers $C_1$, $C_2$ in power cylinder C across one of the ports $A_3$, $A_4$ and one of the fluid circuits 23, 24 and to permit the flow of fluid discharged from the other fluid chamber $C_2$ or $C_1$ into the fluid reservoir R across the other fluid circuit 24 or 23, port $A_4$ or $A_3$, port $A_2$ and fluid circuit 22. This will provide a hydraulic power assist to the driver's steering effort applied to the input shaft 13 during turning maneuvers of the vehicle.

A shown in FIGS. 1 and 2, the hydraulic reaction mechanism B includes two pairs of opposed pistons 17 which are axially slidably disposed within a pair of parallel radial bores 14a formed in an upper end portion of the output shaft 14. The pistons 17 are each applied with a hydraulic reaction pressure in a reaction fluid chamber $B_1$ which is formed between the valve housing 11 and the upper end portion of output shaft 14. The hydraulic reaction mechanism B further includes a pair of radial arms 13b which are integrally formed with a lower end portion of input shaft 13 and disposed between each pair of the pistons 17. The reaction fluid chamber $B_1$ is connected to the fluid reservoir R by way of fluid circuits 25 and 26. The fluid circuit 25 is connected to the fluid circuit 21 through a bypass circuit 27. Disposed between the fluid circuits 25 and 26 is a flow control valve D of the bypass type which is incorporated with the fluid circuit 21 to control the quantity of fluid under pressure flowing thereacross from the pump P to the inlet port $A_1$ of rotary valve assembly A and to permit a predetermined small quantity of fluid under pressure supplied thereacross to the fluid circuits 25 and 26. A throttle $O_1$ is disposed within the bypass circuit 27 to throttle the flow of fluid supplied therethrough from the fluid circuit 21 into the fluid circuit 25, and a throttle $O_2$ is disposed within the fluid circuit 26 to throttle the flow of fluid discharged therethrough into the fluid circuit 22.

As shown clearly in FIG. 3, the bypass type flow control valve D has a valve housing which is provided with an inlet port $D_1$ connected to the pump P through the fluid circuit 21, a pair of radially opposed bypass ports $D_2$ each connected to the fluid circuits 25 and 26, and an outlet port $D_3$ connected to the inlet port $A_1$ of rotary valve assembly A through the fluid circuit 21. The flow control valve D includes a spool 18 slidably disposed within an axial bore in the valve housing, and a compression coil spring 19 arranged to bias the spool 18 upwards. The spool 18 is formed with a radial hole for providing fluid communication between the ports $D_1$ and $D_3$ are formed with a fixed orifice 18a arranged between the port $D_1$ and the bypass ports $D_2$. A solenoid relief valve E is disposed within the fluid circuit 26 downstream of the throttle $O_2$ and connected to an electric control unit G which is connected to a commercially available speed sensor F to produce therefrom an electric control signal indicative of travel speed of the vehicle. When applied with the control signal, the solenoid relief valve E is energized to decrease the quantity of fluid discharged therethrough into the fluid circuit 22 in accordance with an increase in the vehicle speed thereby to increase the hydraulic pressure in the reaction fluid chamber $B_1$.

In operation of the power-assisted steering system, the fluid circuits 25 and 26 are supplied with the predetermined small quantity of fluid under pressure from the bypass ports $D_2$ of flow control valve D. When the rotary valve assemly A is operated to produce a hydraulic pressure in the fluid circuit 21 in accordance with a steering load acting on the dirigible road wheels, the fluid circuit 25 is applied with the hydraulic pressure from the fluid circuit 21 through the throttle $O_1$ in bypass circuit 27. Simultaneously, the solenoid relief valve E cooperates with the throttle $O_2$ to control the quantity of fluid discharged therethrough into the fluid circuit 22 in accordance with travel speed of the vehicle. Thus, the reaction fluid chamber $B_1$ of mechanism B is applied with a hydraulic reaction pressure from the fluid circuit 25 under control of the throttles $O_1$, $O_2$ and the solenoid flow control valve E. The hydraulic reaction pressure in chamber $B_1$ is effective to apply a reaction force to the driver's steering effort in accordance with travel speed of the vehicle. In this instance, during stopping of the vehicle, the driver's steering effort will change in relation to the hydraulic pressure in power cylinder C as shown by a characteristic line I in FIG. 4. During medium speed travel of the vehicle, the driver's steering effort will change as shown by a characteristic line II in FIG. 4. During high speed travel of the vehicle, the driver's steering effort will change as shown by a characteristic line III in FIG. 4.

From the graph of FIG. 4, it will be understood that during stopping of the vehicle, the hydraulic reaction pressure in fluid chamber $B_1$ is maintained in a value $T_1$ under control of the throttles $O_1$, $O_2$ and the solenoid relief valve E. Similarly, the hydraulic reaction pressure in fluid chamber $B_1$ is maintained in a value $T_2$ during medium speed travel of the vehicle and is also maintained in a value $T_3$ during high speed travel of the vehicle. This is useful to enhance stability of the steering wheel in its neutral position in accordance with travel speed of the vehicle. In FIG. 4, the reference character $P_m$ in FIG. 4 represents a predetermined pressure level defined by a relief value (not shown) in the pump P, the reference character $T_4$ represents a reaction force caused by the Torsion bar 12 in the changeover valve unit, and the reference character $T_5$ represents a reaction force caused by an increase of the steering load acting on the dirigible road wheels. In addition, if in the steering system, the bypass circuit 27 with throttle $O_1$ is eliminated, the characteristic lines I, II, III will be obtained as shown by one dot and dash lines in FIG. 4. If in the steering system, the throttle $O_2$ is eliminated, the characteristic lines I, II, III will be obtained as shown by two dots and dash lines in FIG. 4.

Figure 5:
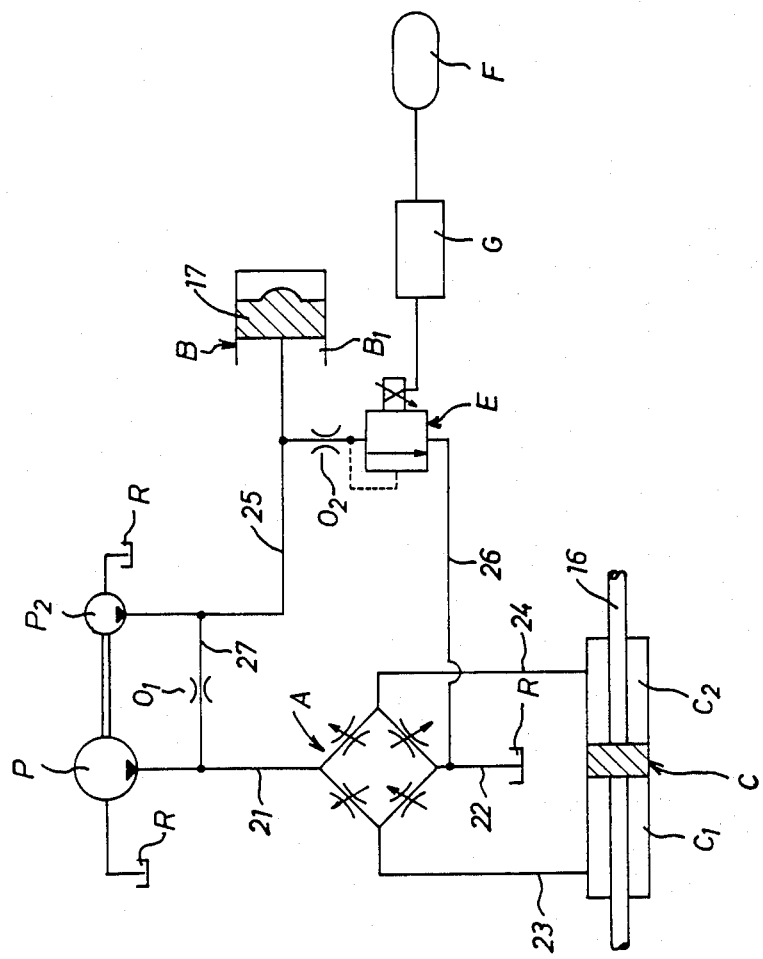
FIG. 5 is a schematic illustration of a modification of the power-assisted steering system shown in FIG. 1.

The power-assisted steering system may be modified as schematically illustrated in FIG. 5, wherein the by-pass type flow control valve D is replaced with an auxiliary hydraulic pump $P_2$ which is coaxially arranged with the primary pump P to supply a predetermined small quantity of fluid under pressure to the fluid circuit 25. In such a modification, it is preferable that the auxiliary pump $P_2$ is in the form of a small size pump mounted on a common drive shaft of the pump P to be driven by the prime mover of the vehicle. Assuming that the rotary valve assembly A is maintained in a neutral position during operation of the modified steering system, the auxiliary pump $P_2$ is driven to maintain the hydraulic reaction pressure in the fluid chamber $B_1$ at the predetermined level, while the pump P is driven in unloaded condition. This is useful to reduce power consumption of the prime mover for driving the pump P during straight travel of the vehicle.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A power-assisted steering system in an automotive vehicle, comprising:

a primary hydraulic pump driven by a prime mover of the vehicle for supply of fluid under pressure;

an auxiliary hydraulic pump driven by the prime mover for supply of a predetermined small quantity of fluid under pressure;

a hydraulic power cylinder operatively connected to the dirigible road wheels of the vehicle;

a changeover valve unit including an input member arranged to be moved by the driver's steering effort applied thereto, an output member operatively connected to said power cylinder, and valve means for controlling the supply of fluid under pressure from said primary hydraulic pump to said power cylinder in response to relative movement between said input and output members;

a hydraulic reaction mechanism associated with said changeover valve unit to apply a reaction force to said input member in accordance with a hydraulic reaction pressure applied thereto, said reaction mechanism including a reaction fluid chamber connected to said auxiliary hydraulic pump to be supplied with the predetermined small quantity of fluid under pressure;

a first throttle disposed within a bypass circuit connecting a first fluid circuit between said primary hydraulic pump and said valve means of said changeover valve unit to a second fluid circuit between said auxiliary hydraulic pump and said reaction fluid chamber;

a second throttle disposed within a third fluid circuit connecting said second fluid circuit to a fluid reservoir; and flow control valve means disposed within said third fluid circuit downstream of said second throttle to decrease the quantity of fluid discharged therethrough into said fluid reservoir in accordance with an increase of travel speed of the vehicle thereby increase the hydraulic pressure in said reaction fluid chamber.

2. A power-assisted steering system as recited in claim 1, wherein said auxiliary hydraulic pump is coaxially arranged with said primary hydraulic pump to be driven by the prime mover on a common drive shaft.

3. A power-assisted steering system as recited in claim 1, wherein said flow control valve means is a solenoid relief valve disposed within said third fluid circuit to be energized by an electric control signal indicative of travel speed of the vehicle.

4. A power-assisted steering system in an automotive vehicle, comprising:

a primary hydraulic pump driven by a prime mover of the vehicle for supply of fluid under pressure;

an auxiliary hydraulic pump driven by the prime mover for supply of a predetermined small quantity of fluid under pressure;

a hydraulic power cylinder operatively connected to dirigible road wheels of the vehicle;

a changeover valve unit including an input member arranged to be moved by the driver's steering effort applied thereto, an output member operatively connected to said power cylinder, and valve means for controlling the supply of fluid under pressure from said primary hydraulic pump to said power cylinder in response to relative movement between said input and output members;

a hydraulic reaction mechanism associated with said changeover valve unit to apply a reaction force to said input member in accordance with a hydraulic reaction pressure applied thereto, said reaction mechanism including a reaction fluid chamber connected to said auxiliary hydraulic pump to be supplied with the predetermined small quantity of fluid under pressure;

flow control valve means disposed within a first fluid circuit, said first fluid circuit connecting a fluid reservoir to a second fluid circuit, said second fluid circuit between said auxiliary hydraulic pump and said reaction fluid chamber, said flow control valve means being arranged to decrease the quantity of fluid discharged therethrough into said fluid reservoir in accordance with an increase of travel speed of the vehicle; and a throttle disposed within a bypass circuit connecting said second fluid circuit to a third fluid circuit between said primary hydraulic pump and said valve means of said changeover valve unit.

5. A power-assisted steering system as recited in claim 4, further comprising a throttle disposed within said first fluid circuit between said reaction fluid chamber and said flow control valve means.

* * * * *